United States Patent
Ayaz et al.

(10) Patent No.: US 12,010,591 B2
(45) Date of Patent: Jun. 11, 2024

(54) PROVIDING MULTICAST/BROADCAST SERVICES IN 5G NETWORKS

(71) Applicant: Huawei Technologies Co., Ltd., Shenzhen (CN)

(72) Inventors: Serkan Ayaz, Munich (DE); Ishan Vaishnavi, Munich (DE); Riccardo Trivisonno, Munich (DE); Chenghui Peng, Shanghai (CN); Chan Zhou, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 519 days.

(21) Appl. No.: 17/176,920

(22) Filed: Feb. 16, 2021

(65) Prior Publication Data
US 2021/0168569 A1    Jun. 3, 2021

Related U.S. Application Data

(63) Continuation of application No. PCT/EP2018/071950, filed on Aug. 13, 2018.

(51) Int. Cl.
*H04W 4/06* (2009.01)
*H04L 12/18* (2006.01)
*H04W 4/50* (2018.01)

(52) U.S. Cl.
CPC .............. *H04W 4/06* (2013.01); *H04W 4/50* (2018.02); *H04L 12/189* (2013.01)

(58) Field of Classification Search
CPC .......... H04L 12/189; H04W 4/06; H04W 4/50
See application file for complete search history.

(56) References Cited

U.S. PATENT DOCUMENTS

| 7,177,658 B2 | 2/2007 | Willenegger et al. |
| 2004/0042479 A1 | 3/2004 | Epstein et al. |

(Continued)

FOREIGN PATENT DOCUMENTS

| CN | 1983945 A | 6/2007 |
| CN | 101132607 A | 2/2008 |

(Continued)

OTHER PUBLICATIONS

"Area of Interest granularity in 23.501," SA WG2 Meeting #123, S2-177980 (was S2-177211), Ljubljana, Slovenia, Total 2 pages, 3rd Generation Partnership Project, Valbonne, France (Oct. 23-27, 2017).

(Continued)

*Primary Examiner* — Khaled M Kassim
*Assistant Examiner* — Kai Chang
(74) *Attorney, Agent, or Firm* — Leydig, Voit & Mayer, Ltd.

(57) ABSTRACT

The invention relates to a control plane network entity for providing a multicast/broadcast service to one or more user equipments (UEs) in a cellular communication network using one or more user plane functions of a plurality of selectable user plane functions. The network entity includes processing circuitry configured to: receive a request for a multicast/broadcast service for the one or more UEs, wherein the request comprises one or more identifiers identifying the one or more UEs and/or one or more spatial regions the one or more UEs are located in; select one or more user plane functions of the plurality of selectable user plane functions on the basis of the one or more identifiers for providing the multicast/broadcast service to the one or more UEs; and provide the one or more selected user plane functions with information about the multicast/broadcast service.

15 Claims, 15 Drawing Sheets

(56) References Cited

U.S. PATENT DOCUMENTS

| | | | |
|---|---|---|---|
| 2008/0163309 A1 | 7/2008 | Kauranen | |
| 2008/0212583 A1 | 9/2008 | Rey et al. | |
| 2010/0322128 A1* | 12/2010 | Becker | H04W 4/08 370/312 |
| 2011/0305183 A1 | 12/2011 | Hsu et al. | |
| 2014/0177506 A1* | 6/2014 | Korus | H04W 4/06 370/312 |
| 2018/0192289 A1 | 7/2018 | Dao | |
| 2018/0199160 A1* | 7/2018 | Edge | H04M 3/5116 |
| 2018/0227743 A1* | 8/2018 | Faccin | H04W 8/08 |
| 2019/0059067 A1* | 2/2019 | Lee | H04L 67/141 |
| 2019/0166452 A1* | 5/2019 | Tenny | H04W 4/02 |
| 2020/0170055 A1* | 5/2020 | Dou | H04W 76/12 |
| 2020/0344576 A1* | 10/2020 | Li | H04W 4/06 |
| 2020/0344827 A1* | 10/2020 | Zong | H04W 64/00 |
| 2021/0014778 A1* | 1/2021 | Xi | H04W 8/26 |
| 2021/0058748 A1* | 2/2021 | Liao | H04W 76/11 |
| 2021/0160680 A1* | 5/2021 | Velev | H04W 4/50 |
| 2021/0321304 A1* | 10/2021 | Karampatsis | H04W 36/0066 |

FOREIGN PATENT DOCUMENTS

| | | | |
|---|---|---|---|
| CN | 101563887 A | 10/2009 | |
| CN | 101884230 A | 11/2010 | |
| CN | 103190162 A | 7/2013 | |
| CN | 104067643 A | 9/2014 | |
| EP | 1928194 A1 | 6/2008 | |
| EP | 3018964 A1 | 5/2016 | |
| EP | 3720155 A1 * | 10/2020 | H04W 4/021 |
| WO | 2018111030 A1 | 6/2018 | |

OTHER PUBLICATIONS

"23.501—Minimizing the need for PDU session re-establishment due to UE mobility and UPF relocation," SA WG2 Meeting #S2-120, S2-173112 (revision of S2-170xxx), Hangzhou, P.R. China, Total 6 pages, 3rd Generation Partnership Project, Valbonne, France (May 15-19, 2017).

Huawei, HiSilicon, "Study of architectural enhancements for 5G Multicast-Broadcast Services," SA WG2 Meeting #127, Sanya, China, S2-184505, total 3 pages, 3rd Generation Partnership Project, Valbonne, France (Apr. 16-20, 2018).

"3rd Generation Partnership Project;Technical Specification Group Services and System Aspects;Service requirements for V2X services;Stage 1(Release 15)," 3GPP TS 22.185 V15.0.0, total 14 pages, 3rd Generation Partnership Project, Valbonne, France (Jun. 2018).

"3rd Generation Partnership Project;Technical Specification Group Services and System Aspects;Enhancement of 3GPP support for V2X scenarios; Stage 1 (Release 15)," 3GPP TS 22.186 V15.2.0, total 16 pages, 3rd Generation Partnership Project, Valbonne, France (Sep. 2017).

"3rd Generation Partnership Project;Technical Specification Group Services and System Aspects;Multimedia Broadcast/Multicast Service (MBMS);Architecture and functional description (Release 15)," 3GPP TS 23.246 V15.0.0, total 77 pages, 3rd Generation Partnership Project, Valbonne, France (Dec. 2017).

"3rd Generation Partnership Project; Technical Specification Group Services and System Aspects; Architecture enhancements for V2X services (Release 15)," 3GPP TS 23.285 V15.0.0, total 36 pages, 3rd Generation Partnership Project, Valbonne, France (Mar. 2018).

"3rd Generation Partnership Project;Technical Specification Group Services and System Aspects;System Architecture for the 5G System;Stage 2 (Release 15)," 3GPP TS 23.501 V15.1.0, total 201 pages, 3rd Generation Partnership Project, Valbonne, France (Mar. 2018).

"3rd Generation Partnership Project;Technical Specification Group Services and System Aspects;Procedures for the 5G System;Stage 2 (Release 15)," 3GPP TS 23.502 V15.2.0, total 308 pages, 3rd Generation Partnership Project, Valbonne, France (Jun. 2018).

"3rd Generation Partnership Project;Technical Specification Group Radio Access Network;MBMS synchronisation protocol (SYNC) (Release 14)," 3GPP TS 25.446 V14.0.0, total 22 pages, 3rd Generation Partnership Project, Valbonne, France (Mar. 2017).

"3rd Generation Partnership Project;Technical Specification Group Core Network and Terminals;Group Communication System Enablers for LTE (GCSE_LTE);MB2 Reference Point;Stage 3 (Release 15)," 3GPP TS 29.468 V15.2.0, total 39 pages, 3rd Generation Partnership Project, Valbonne, France (Dec. 2017).

"3rd Generation Partnership Project;Technical Specification Group Radio Access Network;Evolved Universal Terrestrial Radio Access (E-UTRA);Radio Resource Control (RRC);Protocol specification (Release 15)," 3GPP TS 36.331 V15.1.0, total 786 pages, 3rd Generation Partnership Project, Valbonne, France (Mar. 2018).

"3rd Generation Partnership Project;Technical Specification Group Radio Access Network;Evolved Universal Terrestrial Radio Access Network (E-Utran);M2 Application Protocol (M2AP)(Release 14)," 3GPP TS 36.443 V14.0.1, total 95 pages, 3rd Generation Partnership Project, Valbonne, France (Apr. 2017).

"3rd Generation Partnership Project;Technical Specification Group Radio Access Network;Evolved Universal Terrestrial Radio Access Network (E-UTRAN); M3 Application Protocol (M3AP)(Release 14)," 3GPP TS 36.444 V14.1.0, total 66 pages, 3rd Generation Partnership Project, Valbonne, France (Jun. 2017).

"3rd Generation Partnership Project;Technical Specification Group Radio Access Network;Evolved Universal Terrestrial Radio Access Network(E-UTRAN);M1 data transport(Release 14)," 3GPP TS 36.445 V14.0.0, total 8 pages, 3rd Generation Partnership Project, Valbonne, France (Mar. 2017).

"3rd Generation Partnership Project;Technical Specification Group Radio Access Network;NR;NR and NG-RAN Overall Description;Stage 2 (Release 15)," 3GPP TS 38.300 V15.2.0, total 87 pages, 3rd Generation Partnership Project, Valbonne, France (Jun. 2018).

Huawei, HiSilicon, "Solution for broadcast KI," SA WG2 Meeting #128, Vilnius, Lithuania, S2-186842, total 3 pages, 3rd Generation Partnership Project, Valbonne, France (Jul. 2-6, 2018).

Huawei, HiSilicon, "Key Issue on Broadcast Support for eV2X," SA WG2 Meeting #128, Vilnius, Lithuania, S2-186986, total 2 pages, 3rd Generation Partnership Project, Valbonne, France (Jul. 2-6, 2018).

* cited by examiner

PROVIDING MULTICAST/BROADCAST SERVICES IN 5G NETWORKS

CROSS-REFERENCE TO RELATED APPLICATIONS

This application is a continuation of International Application No. PCT/EP2018/071950, filed on Aug. 13, 2018, the disclosure of which is hereby incorporated by reference in its entirety.

TECHNICAL FIELD

The present disclosure relates generally to the field of telecommunications, and more specifically, to devices, systems and methods for providing multicast/broadcast services in communication networks, in particular 5G networks.

BACKGROUND

The 3GPP LTE system architecture supports multicast/broadcast services by using a stand-alone architecture which is called multimedia broadcast multicast service (MBMS) architecture. This architecture, which is described in 3GPP TS 23.246 v15.0.0, comprises as main components a Broadcast Multicast Service Center (BM-SC) server, a Multimedia Broadcast Multicast Services Gateway (MBMS GW) and a Multicell/Multicast Coordination Entity (MCE). The 3GPP LTE MBMS architecture supports two different operation modes, namely a single-cell point-to-multipoint (SC-PTM) mode and a Multimedia Broadcast Multicast Service over Single Frequency Network (MBSFN) mode. In the MBSFN mode, multiple cells are synchronized and create a single frequency network to perform multicast broadcast transmissions. On the other hand, in the SC-PTM mode, each cell is served independently without synchronizing to other cells. Each MBMS session/bearer may have the context/session attributes described in 3GPP TS 23.246 v15.0.0.

The 5G system architecture currently specified in 3GPP TS 23.501 v15.1.0 does not provide multicast/broadcast service capabilities. However, multicast/broadcast services are essential for different use cases (e.g., V2X scenarios specified in 3GPP TS 22.186 v15.2.0). For this reason, it would be desirable to extend the 5G system architecture so as to support these types of multicast/broadcast services. Although there have been some suggestions for supporting multicast and broadcast services in a 5G communication network, there is still a need for devices and methods for providing multicast/broadcast services in a communication networks, in particular a 5G communication network in a cost effective and efficient manner.

SUMMARY

Generally, embodiments of the present disclosure allow for making an initial selection of user plane (UP) functions supporting multicast broadcast services (MBS) (i.e., UP MBS or Enhanced-UPF). Moreover, embodiments of the present disclosure provide for user plane mobility support, for instance, for V2X scenarios, where a re-selection of user plane functions becomes necessary.

According to a first aspect, the disclosure relates to a control plane network entity for providing a multicast and/or broadcast service (herein referred to as a multicast/broadcast service (MBS)) to one or more user equipments, UEs, in a cellular communication network using one or more user plane functions (UPFs) of a plurality of selectable user plane functions of the cellular communication network. The network entity is configured to: receive a request, in particular a session setup request or a session update request, for a multicast/broadcast service for the one or more user equipments, wherein the request comprises one or more identifiers identifying the one or more user equipments and/or one or more spatial regions the one or more user equipments are located in; select one or more user plane functions of the plurality of selectable user plane functions on the basis of the one or more identifiers for providing the multicast/broadcast service to the one or more user equipments; and provide the one or more selected user plane functions with information about the multicast/broadcast service.

In an implementation form the cellular communication network is a 5G communication network. In a 5G communication network the architecture elements can be defined as network functions (NFs) that offer their services via interfaces of a common framework to any network functions that are permitted to make use of these provided services (which is also called serviced based architecture). Service based principles apply between the control plane network functions of the core network of a 5G communication network. Thus the control plane network entity according to the first aspect can comprise one or more physical network devices and/or one or more network functions implemented on one or more physical devices of the cellular communication network, in particular 5G communication network.

As used herein, the "multicast/broadcast service" covers any kind of multicast/broadcast service, including multicast/broadcast sessions, flows, bearers and the like. In an implementation form, the request can further comprise multicast/broadcast service/session and/or bearer attributes, such as a session ID and/or a flow ID and/or QoS information.

In a further possible implementation form of the first aspect, the one or more identifiers identify the one or more user equipments, wherein the network entity is further configured to transmit the one or more identifiers to a further network entity, in particular an access and mobility management function (AMF) entity of the cellular communication network and to receive from the further network entity, in response thereto, one or more further identifiers, in particular one or more cell IDs, identifying one or more communication cells of the cellular communication network and/or one or more base stations of the cellular communication network defining the one or more communication cells, wherein the network entity is configured to select the one or more user plane functions on the basis of the one or more further identifiers for providing the multicast/broadcast service to the one or more user equipments. In an implementation form the one or more identifiers comprise one or more UE IDs.

In a further possible implementation form of the first aspect, the one or more identifier identify a service area comprising a plurality of communication cells of the cellular communication network serving the one or more user equipments, wherein the network entity is further configured to transmit the one or more identifiers to a further network entity, in particular an access and mobility management function (AMF) entity of the cellular communication network and to receive from the further network entity, in response thereto, one or more further identifiers, in particular one or more cell IDs, identifying one or more communication cells of the cellular communication network and/or one or more base stations of the cellular communication network defining the one or more communication cells, wherein the network entity is configured to select the one or more user plane functions on the basis of the one or more further identifiers for providing the multicast/broadcast service to the one or more user equipments. In an implementation form the one or more identifiers comprise one or more service area identifiers, SAIs.

In a further possible implementation form of the first aspect, the one or more identifiers identify one or more communication cells of the cellular communication network and/or one or more base stations of the cellular communication network defining the communication cell. In an implementation form the one or more identifiers comprise one or more cell IDs. The cell IDs can comprise a New Radio (NR) Cell Global Identifier (NCGI), a gNB Identifier (gNB ID) or global gNB IDs, as specified in 3GPP TS 38.300.

In a further possible implementation form of the first aspect, the network entity is configured to select the one or more user plane functions on the basis of one or more service requirements, in particular a quality of service requirement of the multicast/broadcast service and/or one or more performance measures of the plurality of selectable user plane functions, in particular a respective run-time load of the plurality of selectable user plane functions.

In a further possible implementation form of the first aspect, the multicast/broadcast service is already provided to the one or more user equipments using one or more source, i.e. current user plane functions of the plurality of selectable user plane functions and wherein the network entity is further configured to select one or more target, i.e. new user plane functions of the plurality of selectable user plane functions for continuing providing the multicast/broadcast service to the one or more user equipments. Thus, the network entity according to the first aspect is configured to perform a kind of handover from the currently selected user plane function(s), i.e. the one or more source user plane functions, to one or more newly selected user plane functions, i.e. the one or more target user plane functions. In an implementation form this handover (also referred to as "session update" to distinguish from the "session setup", as already defined above, where the multicast/broadcast service is not provided yet and one or more user plane functions have to be selected) can be triggered by the network entity on the basis of user equipment(s) handover/movement to a different service area, cell and/or base station.

In a further possible implementation form of the first aspect, the network entity is further configured to inform the one or more source, i.e. currently selected user plane functions about the newly selected one or more target user plane functions and to trigger the one or more source user plane functions to forward data packets related to the multicast/broadcast service to the selected one or more target user plane functions.

In a further possible implementation form of the first aspect, wherein the network entity is further configured to trigger the one or more source, i.e. currently selected user plane functions to forward one or more end marker data packets to the newly selected one or more target user plane functions, wherein the one or more end marker data packets inform the newly selected one or more target user plane functions that no further data packets will be received from the one or more source, i.e. currently selected user plane functions. In an implementation form the one or more end marker data packets can comprise dummy information, as defined in TS 36.300. In an implementation form, the one or more end marker data packets can comprise user data and an additional identifier or tag for informing the newly selected one or more target user plane functions that no further data packets will be received from the one or more source, i.e. currently selected user plane functions.

In a further possible implementation form of the first aspect, the network entity is further configured to trigger the one or more target user plane functions to reorder data packets received from the one or more source user plane functions and/or from an application server for providing the multicast/broadcast service to the one or more user equipments.

In a further possible implementation form of the first aspect, the network entity is further configured to inform an application server for providing the multicast/broadcast service to the one or more user equipments about the selected one or more target user plane functions and to trigger the application server to forward data packets related to the multicast/broadcast service to the one or more source user plane functions and/or the selected one or more target user plane functions for a predefined time duration. The predefined time duration can be part of the information provided by the network entity to the one or more source user plane functions and/or the one or more target user plane functions in order to allow the one or more source user plane functions to forward data packets related to the selected one or more target user plane functions for the predefined time duration. In an implementation form, both the one or more source user plane functions and the one or more target user plane functions can send duplicated data packets to the one or more communication cells and/or base stations and these one or more communication cells and/or base stations can perform a removal of duplicate data packets and/or a re-ordering of duplicate data packets based, for instance, on sequence numbers.

In a further possible implementation form of the first aspect, the request is a session update request and comprises one or more identifiers, in particular one or more UE IDs, identifying the one or more user equipments and information about one or more current spatial positions of the one or more user equipments.

In a further possible implementation form of the first aspect, the network entity is further configured to receive a UE location update message from a further network entity, in particular an access and mobility management function (AMF) entity of the cellular communication network, wherein the UE location update message comprises one or more identifiers, in particular one or more cell IDs, identifying one or more communication cells the one or more user equipments are currently located in and/or one or more base stations of the cellular communication network defining the one or more communication cells the one or more user equipments are currently located in.

In a further possible implementation form of the first aspect, the network entity is configured to receive the request comprising the one or more identifiers from an application server, an application function and/or a control function, in particular a V2X control function of the cellular communication network for providing the multicast/broadcast service to the one or more user equipments.

In a further possible implementation form of the first aspect, the network entity is either a group session management function (G-SMF) implemented in the control plane as a part of SMF or a dedicated control plane multicast/broadcast service (CP MBS) entity implemented in the control plane as a separate function of the cellular communication network.

According to a second aspect, the disclosure relates to a corresponding method for providing a multicast/broadcast service to one or more user equipments in a cellular communication network using one or more user plane functions of a plurality of selectable user plane functions of the cellular communication network. The method comprises the steps of: receiving a request, in particular a session setup request or a session update request, for a multicast/broadcast service for the one or more user equipments, wherein the request comprises one or more identifiers identifying the one or more user equipments and/or one or more spatial regions the one or more user equipments are located in; selecting one or more user plane functions of the plurality of selectable user plane functions on the basis of the one or more identifiers for providing the multicast/broadcast service to the one or more user equipments; and providing the one or more selected user plane functions with information about the multicast/broadcast service.

The method according to the second aspect can be performed by the network entity according to the first aspect. Further features of the method according to the second aspect result directly from the functionality of the network entity according to the first aspect and its different implementation forms described above and below.

According to a third aspect, the disclosure relates to an access and mobility management function (AMF) entity for a cellular communication network comprising a plurality of selectable user plane functions for providing a multicast/broadcast service to one or more user equipments of the cellular communication network, wherein the AMF entity is configured to: determine, in response to receiving one or more identifiers from a network entity of the communication network, wherein the one or more identifiers identify the one or more user equipments and/or a service area comprising a plurality of communication cells of the cellular communication network serving the one or more user equipments, one or more further identifiers, in particular one or more cell IDs, on the basis of the one or more identifiers, wherein each further identifier identifies a communication cell of the cellular communication network and/or a base station of the cellular communication network defining the communication cell; and transmit the one or more further identifiers to the network entity for selecting one or more of the plurality of selectable user plane functions.

According to a fourth aspect, the disclosure relates to a corresponding method for operating an access and mobility management function (AMF) entity in a cellular communication network comprising a plurality of selectable user plane functions for providing a multicast/broadcast service to one or more user equipments of the cellular communication network, wherein the method comprises the steps of: determining, in response to receiving one or more identifiers from a network entity of the communication network, wherein the one or more identifiers identify the one or more user equipments and/or a service area comprising a plurality of communication cells of the cellular communication network serving the one or more user equipments, one or more further identifiers, in particular one or more cell IDs, on the basis of the one or more identifiers, wherein each further identifier identifies a communication cell of the cellular communication network and/or a base station of the cellular communication network defining the communication cell; and transmitting the one or more further identifiers to the network entity for selecting one or more of the plurality of selectable user plane functions.

The method according to the fourth aspect can be performed by the AMF entity according to the third aspect. Further features of the method according to the fourth aspect result directly from the functionality of the AMF entity according to the third aspect and its different implementation forms described above and below.

According to a fifth aspect, the disclosure relates to a computer program product comprising program code for performing the method according to the second aspect and/or the method according to the fourth aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the present disclosure are described in more detail with reference to the attached figures and drawings, in which.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
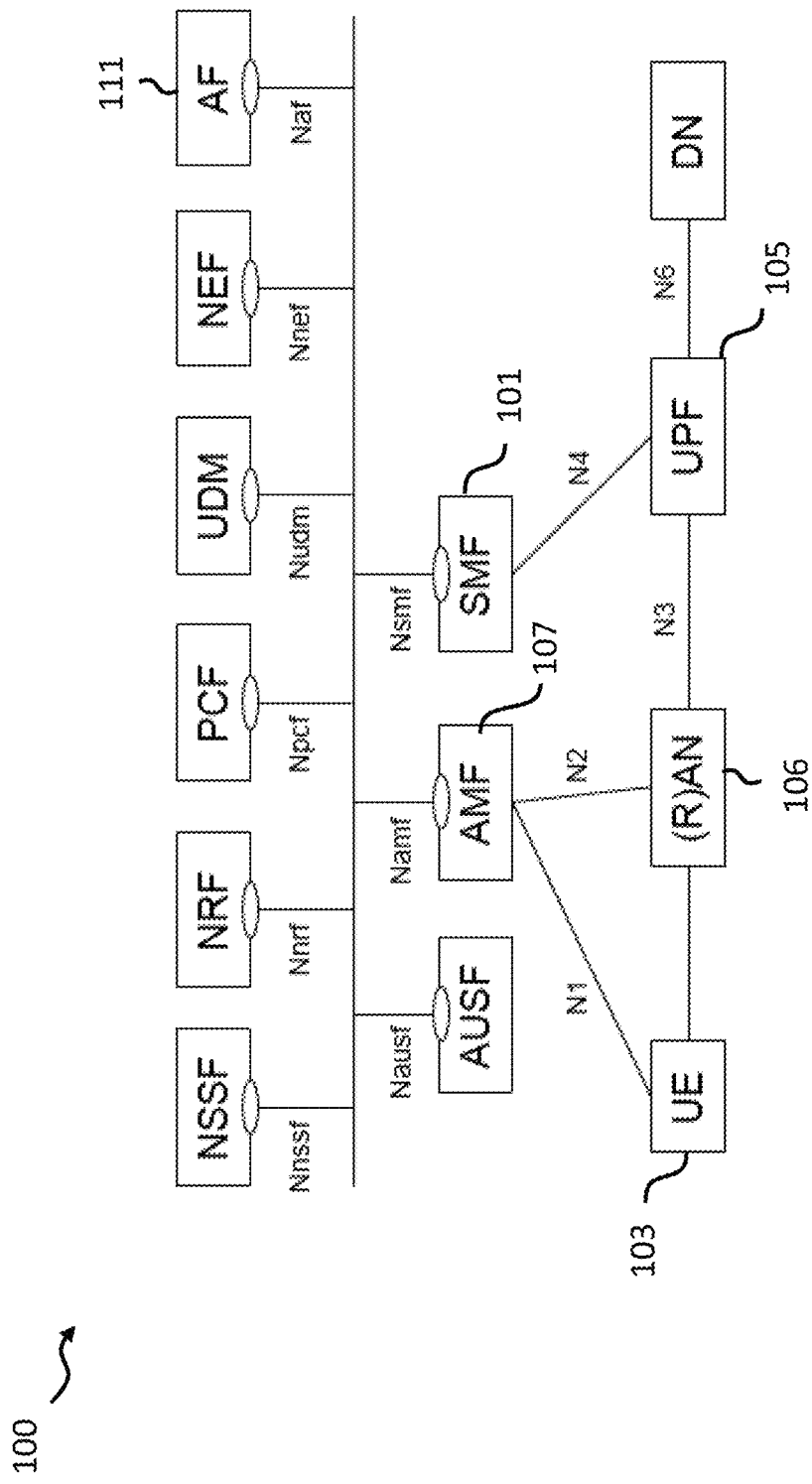
FIG. 1 is a schematic diagram illustrating the conventional architecture of a 5G communication network.

In order to set the stage for describing different aspects of the present disclosure, reference is made to FIG. 1, which illustrates the architecture of a conventional 5G communication network 100, as defined, for instance, in 3GPP TS 23.501 v15.1.0. In this architecture, service-based interfaces (SBIs) are used within the control plane (CP). Furthermore, the following main interfaces (reference points) are defined: N1, i.e. the reference point between a user equipment (UE) 103 and the access and mobility management function (AMF) 107; N2, i.e. the reference point between the radio access network ((R)AN) 106 and the AMF 107; N3, i.e. the reference point between the (R)AN 106 and a user plane function (UPF) 105; N4, i.e. the reference point between a session management function (SMF) 101 and the UPF 105; N6, i.e. the reference point between the UPF and a data network (DN); and N9, i.e. the reference point between two UPFs.

Figure 2:
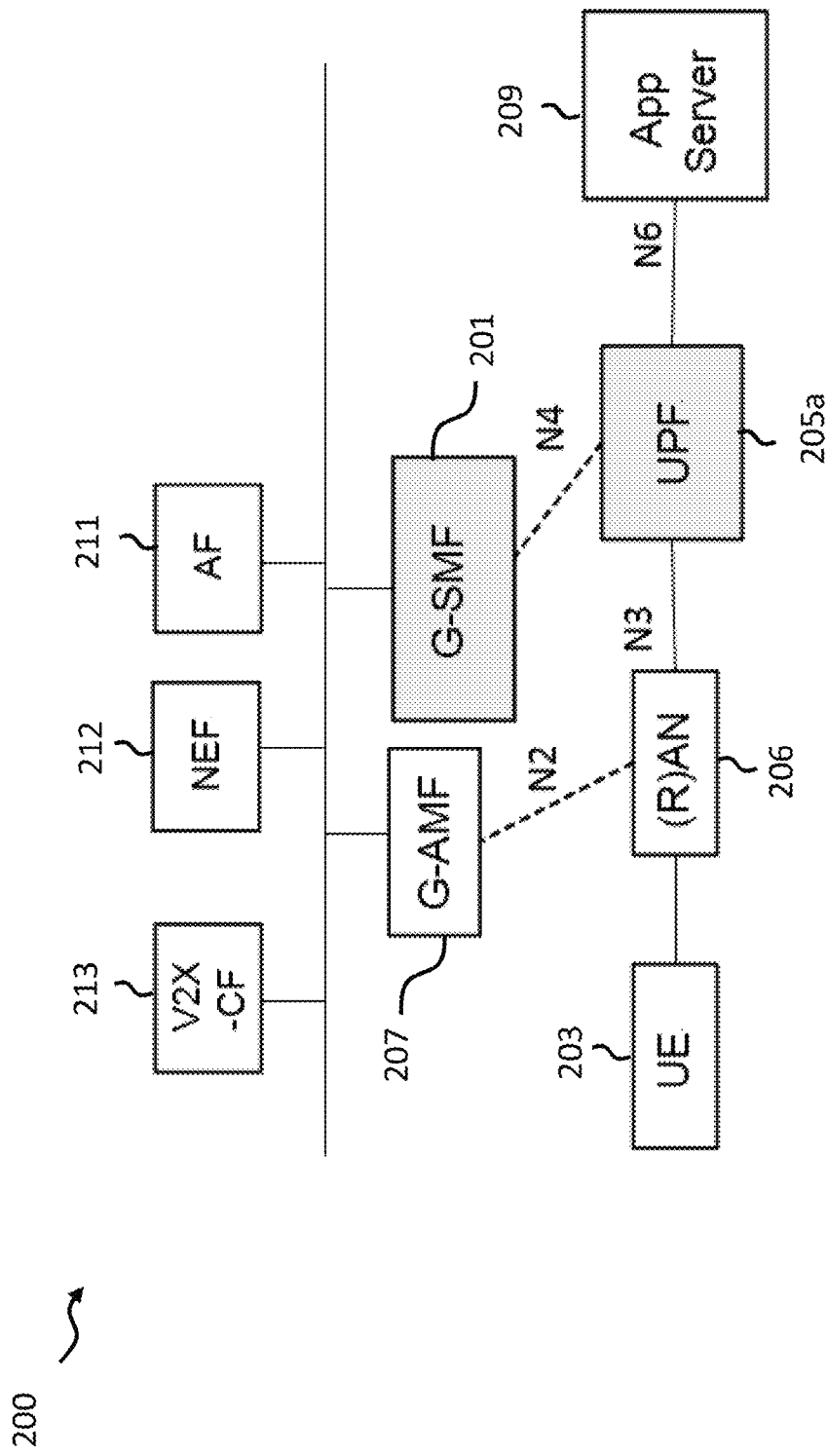
FIG. 2 is a schematic diagram showing an exemplary architecture of a cellular communication network comprising a network entity according to an embodiment for providing a multicast/broadcast service to a user equipment.

FIG. 2 is a schematic diagram showing an exemplary architecture of a cellular communication network 200 comprising a control plane network entity 201 according to an embodiment for providing a multicast/broadcast service to a user equipment 203 using one or more user plane functions 205a of a plurality of selectable user plane functions of the cellular communication network 200. As illustrated in FIG. 2, the network entity 201 can be referred to as a group session management function (G-SMF) 201, because it can be considered to be an extension of the SMF 101 of the conventional 5G communication network illustrated in FIG. 1 (as will be described in more detail further below). According to a further alternative, the network entity 201 can be implemented as a separate control plane (CP) multicast/broadcast service (CP MBS).

In addition to the network entity, in particular G-SMF 201 the communication network 200 comprises as a further main component a further network entity 207, in particular an access and mobility management function (AMF) entity 207. As this AMF entity 207 can be considered to be an extension of the AMF 107 of the conventional 5G communication network illustrated in FIG. 1 (as will be described in more detail further below), it is referred to in FIG. 2 as a group-access and mobility management function (G-AMF) entity 207.

Generally, as will be described in more detail below, the G-AMF 207 and G-SMF 201 are mainly handling all control plane functionalities of setting up, modifying and tearing down the broadcast communication session as requested by an application server (AS) 209 or application function (AF) 211 (possibly via a network exposure function 212) or by control function 213, in particular a V2X control function (V2XCF) 213.

As will be described in more detail below, the control plane network entity 201, in particular G-SMF 201 is configured to receive a request, in particular a session setup request or a session update request, for a multicast/broadcast service for the one or more user equipments 203, wherein the request comprises one or more identifiers identifying the one or more user equipments 203 and/or one or more spatial regions the one or more user equipments 203 are located in. As will be described in more detail further below, in embodiments of the disclosure, the one or more identifiers identifying the one or more user equipments 203 and/or one or more spatial regions the one or more user equipments 203 are located in can comprise one or more UE IDs identifying the one or more user equipments 203, one or more SAIs identifying one or more spatial regions the one or more user equipments 203 are located in and/or cell IDs identifying one or more spatial regions the one or more user equipments 203 are located in.

Moreover, the control plane network entity 201, in particular G-SMF 201 is configured to select one or more user plane functions 205a-c (illustrated, for instance, in FIG. 3) of the plurality of selectable user plane functions on the basis of the one or more identifiers for providing the multicast/broadcast service to the one or more user equipments 203. Moreover, the control plane network entity 201, in particular G-SMF 201 is configured to provide the one or more selected user plane functions 205a-c with information about the multicast/broadcast service.

As will be described in more detail below, the AMF entity 207 is configured to determine, in response to receiving one or more identifiers from the network entity 201, in particular G-SMF 201, wherein the one or more identifiers identify the one or more user equipments 203 and/or a service area comprising a plurality of communication cells of the cellular communication network 200 serving the one or more user equipments 203, one or more further identifiers, in particular one or more cell IDs, on the basis of the one or more identifiers, wherein each further identifier identifies a communication cell of the cellular communication network 200 and/or a base station of the cellular communication network 200 defining the communication cell; and transmit the one or more further identifiers to the network entity 201, in particular G-SMF 201 for selecting one or more of the plurality of selectable user plane functions 205*a-c*.

In the 5G system architecture, there may be multiple user plane functions (also referred to as UP MBS (i.e., Enhanced-UPF—eUPF)) 205*a-c* supporting multicast/broadcast functionality for different reasons, such as reducing the end to end communication latency by selecting topologically optimal user plane functions 205*a-c* for the relevant (R)ANs 206, multicast session load distribution among different user plane functions 205*a-c* and the like. For such scenarios, the control plane network entity 201, in particular G-SMF 201 is configured to select the optimal user plane function(s) 205*a-c* on the basis of one or more service requirements, in particular a quality of service requirement of the multicast/broadcast service and/or one or more performance measures of the plurality of selectable user plane functions 205*a-c*, in particular a respective run-time load of the plurality of selectable user plane functions 205*a-c*.

Figure 3:
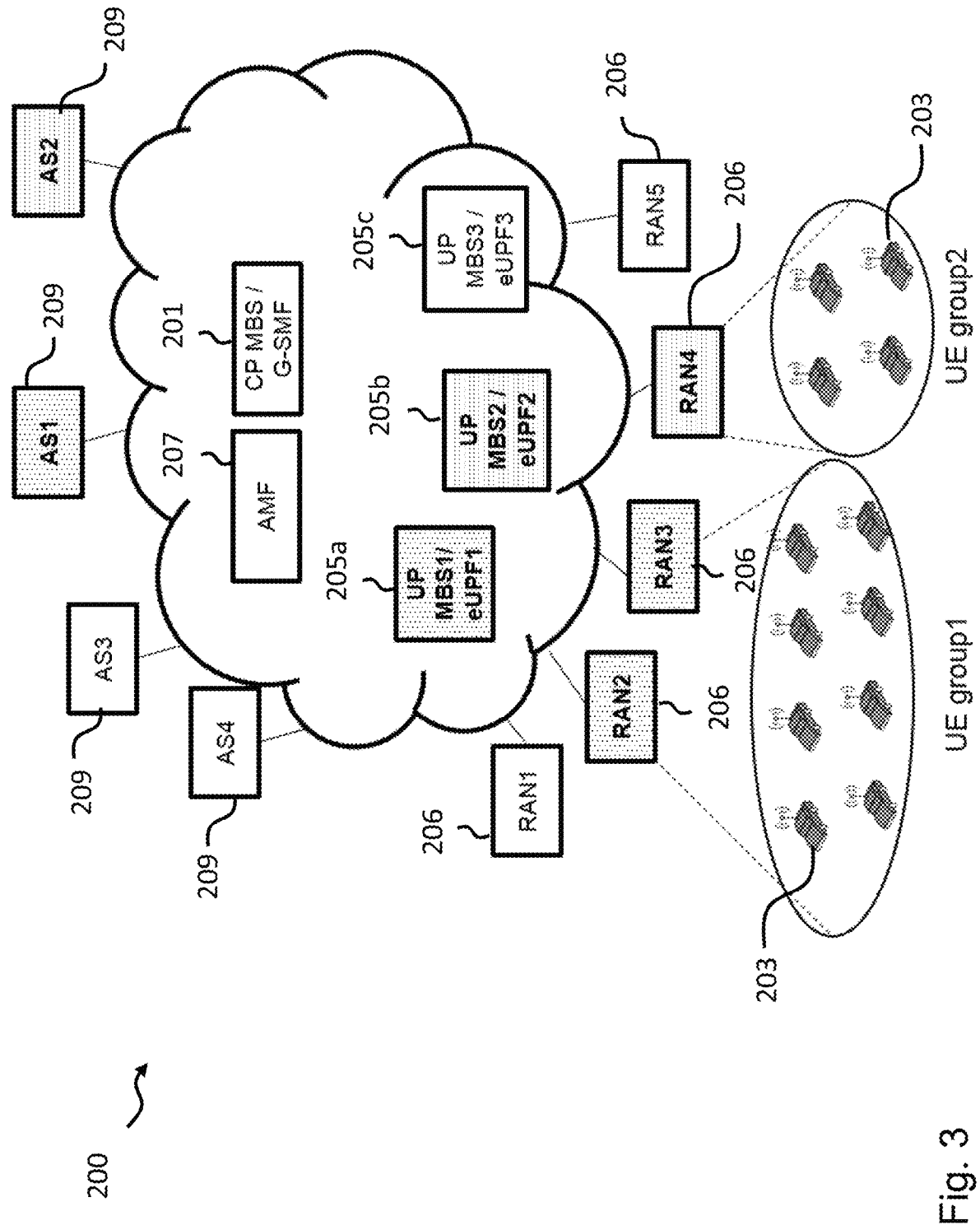
FIG. 3 is a schematic diagram illustrating an exemplary scenario addressed by a network entity according to an embodiment in the exemplary network architecture of FIG. 2.

FIG. 3 shows an example scenario in which the user plane function referred to as UP MBS1 205*a* is selected as the session anchor for UE group 1 (e.g., V2X service type 1) performing multicast broadcast transmissions via RAN2 206 and RAN3 206 and the user plane function referred to as UP MBS2 205*b* is selected as another session anchor for UE group 2 (e.g., V2X service type 2) performing multicast broadcast transmissions via RAN4 206. As already described above, this selection can be done by the control plane network entity 201, in particular G-SMF 201 according to an embodiment.

Figure 4:
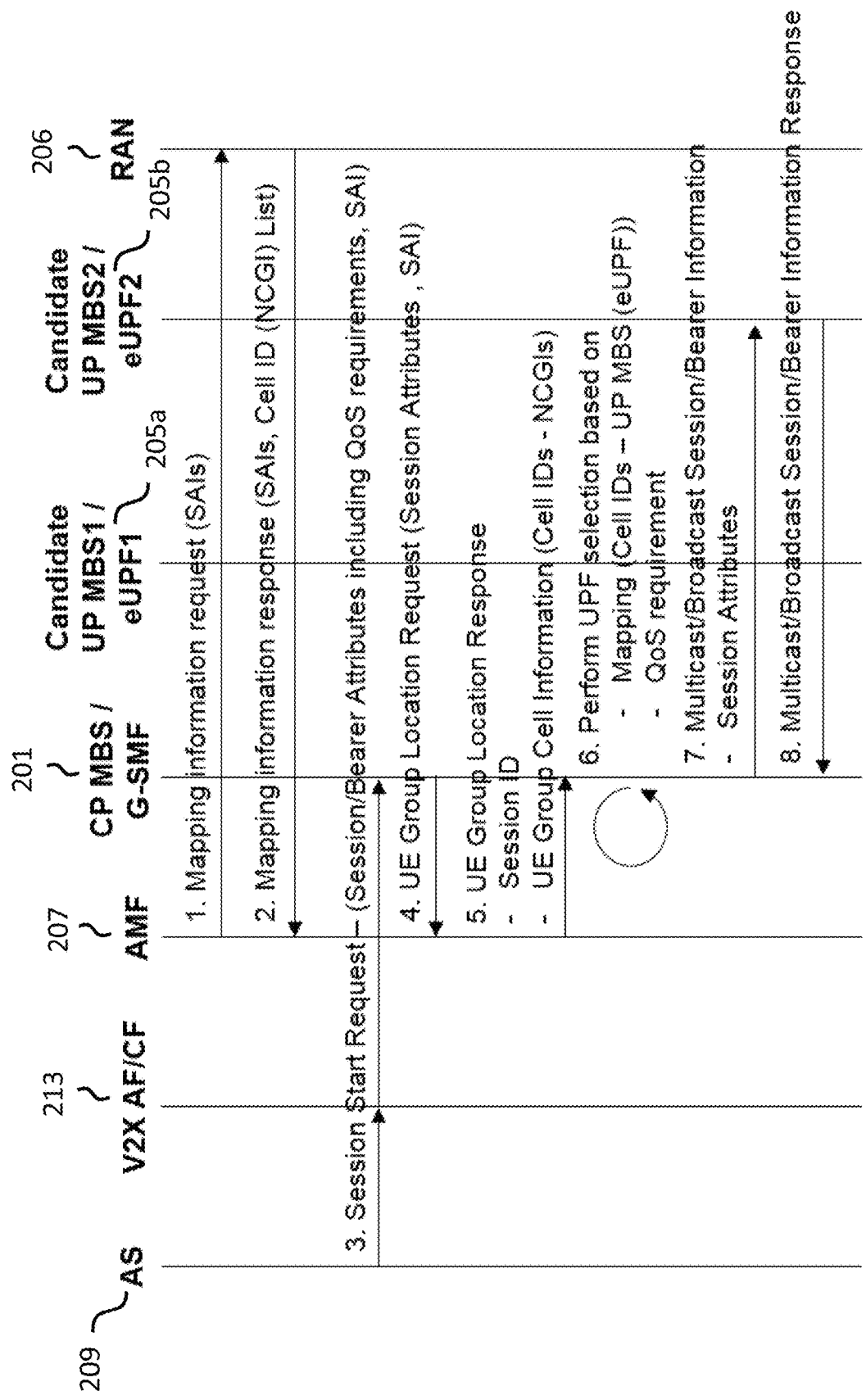
FIG. 4 is a signaling diagram illustrating an initial selection of a user plane function by a network entity according to an embodiment within the exemplary network architecture of FIG. 2.

FIG. 4 shows a signaling diagram illustrating an initial selection of a user plane function 205*a-c* by the control plane network entity 201, in particular G-SMF 201 according to an embodiment. This embodiment is based on the use of identifiers identifying the one or more spatial regions the one or more user equipments 203 are located in, in particular service area identifiers (SAIs). In this embodiment, each RAN 206 collects information for mapping service area identifiers (SAIs) into cell IDs. These cell IDs can be a new radio (NR) cell global identifier (NCGI), a gNB identifier (gNB ID) or a global gNB ID, as defined in 3GPP TS 38.300. As illustrated in steps 1 and 2 of FIG. 4, each RAN, such as the RAN 206 can provide this information for mapping service area identifiers (SAIs) into cell IDs to the AMF 207. Furthermore, this mapping information can also be provided by an Operation and Maintenance (O&M) function in the control plane to the AMF 207.

When a session start request is sent in step 3 of FIG. 4 by the application server 209 (including SAI information for the one or more UEs 203) to the network entity 201, in particular G-SMF 201, the network entity 201, in particular G-SMF 201 requests the corresponding cell IDs for that SAI from the AMF 207 (step 4 of FIG. 4). The AMF 207 already has this (SAI, cell IDs) mapping information from each RAN 206 (i.e., gNB) and provides the corresponding cell IDs to the network entity 201, in particular G-SMF 201 (step 5 of FIG. 4). In step 6 of FIG. 4 the network entity 201, in particular G-SMF 201 selects one or more user plane functions 205*a-c* of the plurality of selectable user plane functions on the basis of the cell IDs provided by the AMF 207. When the network entity 201, in particular G-SMF 201 is making this selection, it may also take into account the QoS requirements (e.g., end-to-end delay, reliability, etc.) of the requested multicast/broadcast service, as already described above and illustrated in step 6 of FIG. 4. Once the network entity 201, in particular G-SMF 201 has selected the exemplary user plane function 205*b*, it sends multicast/broadcast session/bearer information to start/setup the session (step 7 of FIG. 4), which can be followed up by a response from the selected user plane function 205*b* (step 8 of FIG. 4).

Figure 5:
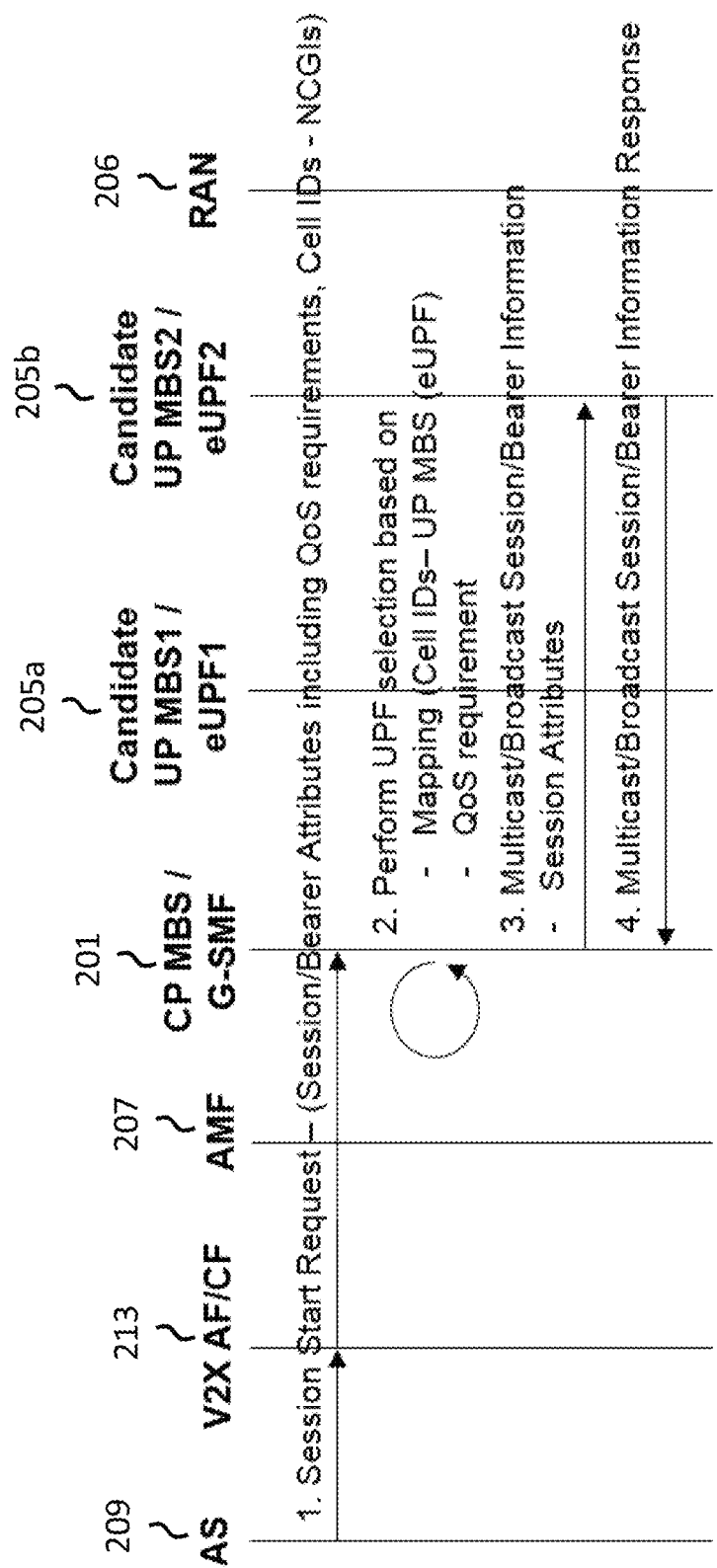
FIG. 5 is a signaling diagram illustrating an initial selection of a user plane function by a network entity according to another embodiment within the exemplary network architecture of FIG. 2.

FIG. 5 shows a signaling diagram illustrating an initial selection of a user plane function 205*a-c* by the control plane network entity 201, in particular G-SMF 201 according to a further embodiment. This embodiment is based on the use of identifiers identifying the one or more communication cells the one or more user equipments 203 are located in, in particular cell IDs (also referred to as NCGIs). When the session start request is sent in step 1 of FIG. 5 by the application server 209 (including a list of cell IDs (NCGIs) for the one or more user equipments 203) to the network entity 201, in particular G-SMF 201, the network entity 201, in particular G-SMF 201 can directly performs the user plane function selection based on the provided identifiers, in particular cell IDs and/or NCGIs (step 2 of FIG. 5). Similar to the embodiment of FIG. 4, when the network entity 201, in particular G-SMF 201 is making the user plane function selection, it may also take into account the QoS requirements (e.g., end-to-end delay, reliability, etc.) of the requested multicast/broadcast service. Once the network entity 201, in particular G-SMF 201 has selected the exemplary user plane function 205*b*, it sends multicast/broadcast session/bearer information to start/setup the session (step 3 of FIG. 5), which can be followed up by a response from the selected user plane function 205*b* (step 4 of FIG. 5).

Figure 6:
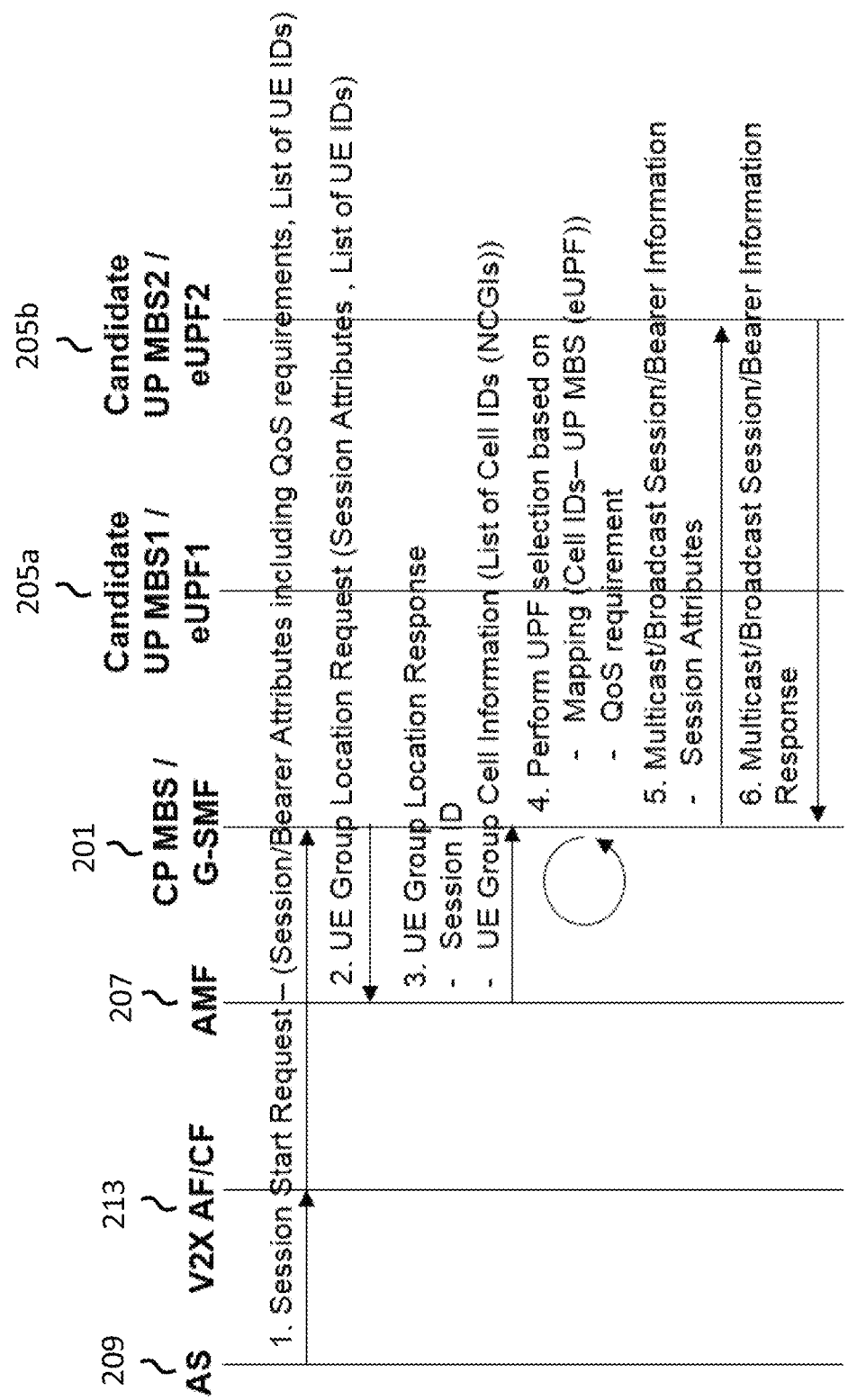
FIG. 6 is a signaling diagram illustrating an initial selection of a user plane function by a network entity according to another embodiment within the exemplary network architecture of FIG. 1.

FIG. 6 shows a signaling diagram illustrating an initial selection of a user plane function 205*a-c* by the control plane network entity 201, in particular G-SMF 201 according to a further embodiment. This embodiment is based on the use of identifiers identifying the one or more user equipments 203, in particular UE IDs. In this embodiment the AS 209 sends the UE IDs (registered for the multicast/broadcast group of user equipments 203) in the session start request (step 1 of FIG. 6). When the network entity 201, in particular G-SMF 201 receives the request, it asks from the AMF 207 which cell IDs (NCGIs) are associated with these UEs 203 (step 2 of FIG. 6). In response, the AMF 207 returns the list of cell IDs (NCGIs) serving these UEs 203 in the response message (step 3 of FIG. 6). On the basis thereof the network entity 201, in particular G-SMF 201 selects the user plane function 205*b* (step 4 of FIG. 6). Similar to the embodiments of FIGS. 4 and 5, when the network entity 201, in particular G-SMF 201 is making the user plane function selection, it may also take into account the QoS requirements (e.g., end-to-end delay, reliability, etc.) of the requested multicast/broadcast service. Once the network entity 201, in particular G-SMF 201 has selected the exemplary user plane function 205*b*, it sends multicast/broadcast session/bearer information to start/setup the session (step 5 of FIG. 6), which can be followed up by a response from the selected user plane function 205*b* (step 6 of FIG. 6).

As already described above, embodiments of the disclosure not only allow for an initial selection of one or more user plane functions for providing a multicast/broadcast service to the user equipment 203, but also for a re-selection or session update of one or more user plane functions, when the user equipment 203 is already being provided with the multicast/broadcast service by one or more other user plane functions. This can be advantageous, because some applications (e.g. V2X Platooning) may require long multicast/broadcast sessions (e.g., some hours), while the one or more UEs 203 are on the move. In these scenarios, the initially selected user plane functions (herein also referred to as source user plane functions) may topologically be far away due to mobility of the one or more UEs 203. This increases end-to-end communication delay and data has to be forwarded over more hops. Thus, for such scenarios, embodiments of the disclosure allow to change the initially assigned/selected user plane function session anchor (i.e. the source user plane functions) as the multicast session continues depending on the mobility pattern of the one or more UEs 203, so that the end-to-end communication delay can be limited.

Figure 7:
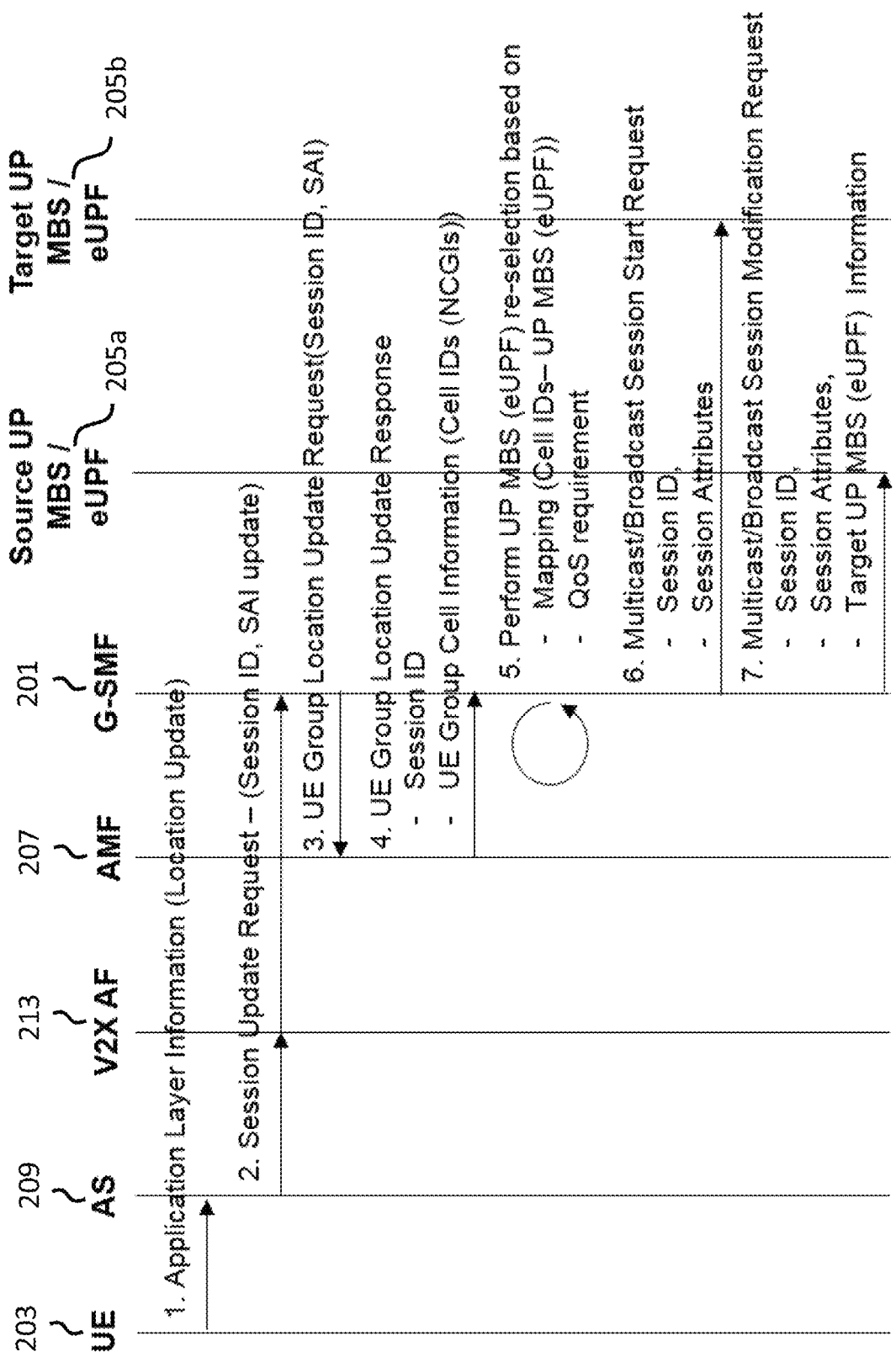
FIG. 7 is a signaling diagram illustrating a re-selection of a user plane function by a network entity according to an embodiment within the exemplary network architecture of FIG. 2.

FIG. 7 is a signaling diagram illustrating a first stage of a re-selection procedure of a user plane function by the network entity 201, in particular G-SMF 201 according to an embodiment. The re-selection procedure shown in FIG. 7 comprises the following steps:

1. Each UE 203 sends location information to the application server (AS) 209.
2. Based on the UE position reporting, the AS 209 may identify new, i.e. changed SAIs and sends a session update request message to the network entity 201, in particular G-SMF 201.
3. The network entity 201, in particular G-SMF 201 receives the session update request message and sends an UE group location update request message to the AMF 207 so as to learn the new cell IDs (NCGIs) based on the new SAIs.
4. The AMF 207 returns the relevant cell IDs (NCGIs) to the network entity 201, in particular G-SMF 201 in the response message.
5. The network entity 201, in particular G-SMF 201 performs a new selection of one or more user plane functions, i.e. a re-selection on the basis of the new cell IDs.
6. Once the network entity 201, in particular G-SMF 201 has selected the exemplary target user plane function 205b, it sends a new session start request to the exemplary target user plane function 205b and provides information, such as session attributes.
7. Moreover, the network entity 201, in particular G-SMF 201 sends a multicast/broadcast session modification request message to the currently assigned, i.e. source user plane function 205a and provides information about the newly selected target user plane function 205b, such as session attributes, including address information.

Similar to the embodiments for the initial session setup procedure illustrated in FIGS. 4 to 6, also the session update procedure can be based on other identifiers than the SAIs described in the context of the embodiment shown in FIG. 7.

Figure 8:
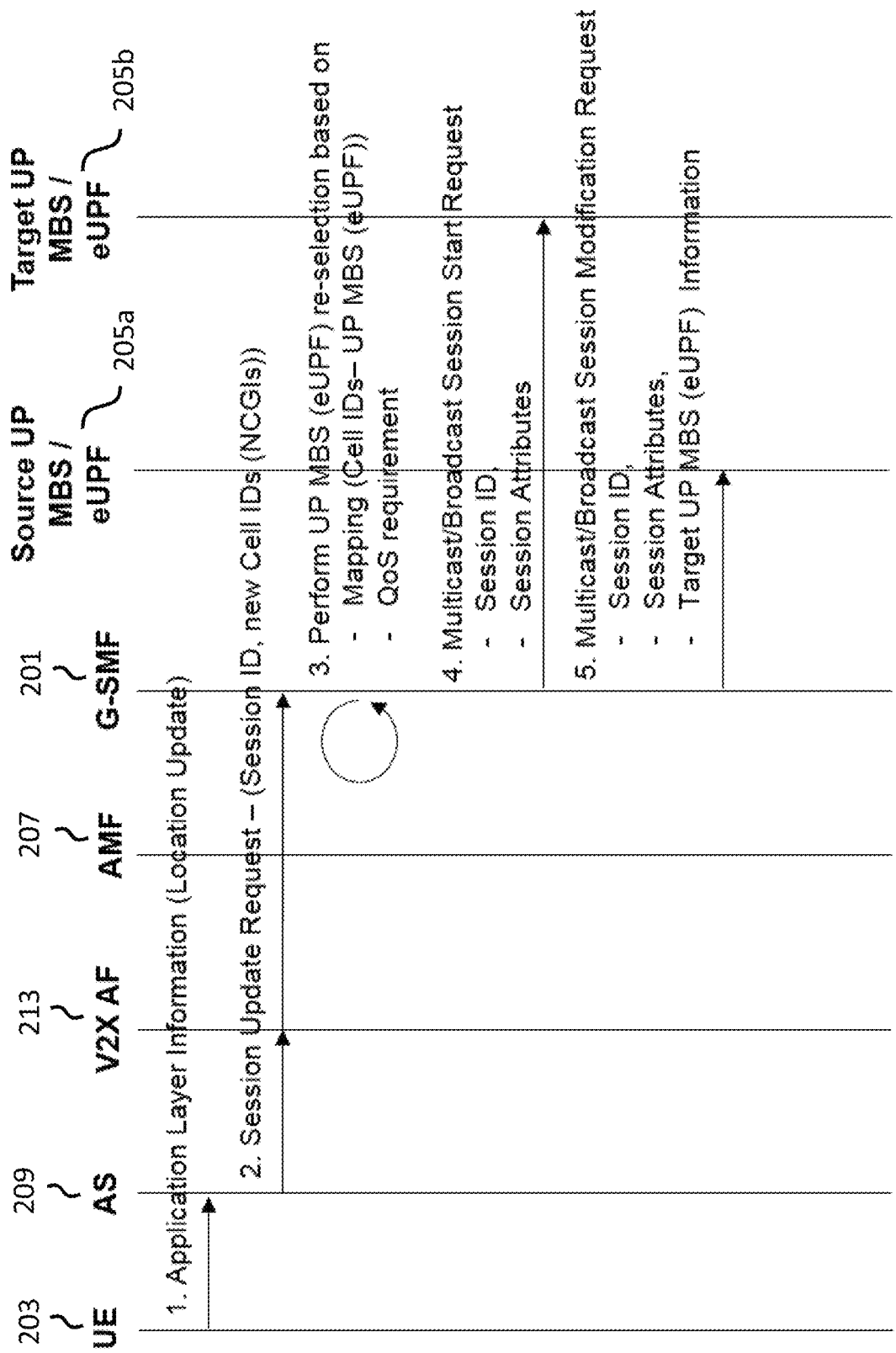
FIG. 8 is a signaling diagram illustrating a re-selection of a user plane function by a network entity according to another embodiment within the exemplary network architecture of FIG. 2.

In the re-selection procedure illustrated in FIG. 8 the network entity 201, in particular G-SMF 201 according to an embodiment is configured to re-select the exemplary target user plane function 205b on the basis of cell IDs directly provided by the application server as part of the session update request (step 2 of FIG. 8). As will be appreciated, in this case there is no interaction with the AMF 207 required and the network entity 201, in particular G-SMF 201 can directly proceed to selecting the exemplary target user plane function 205b (step 3 of FIG. 8). As steps 4 and 5 of FIG. 8 are identical to steps 6 and 7 of FIG. 7, reference is made to the above detailed description of FIG. 7.

Figure 9:
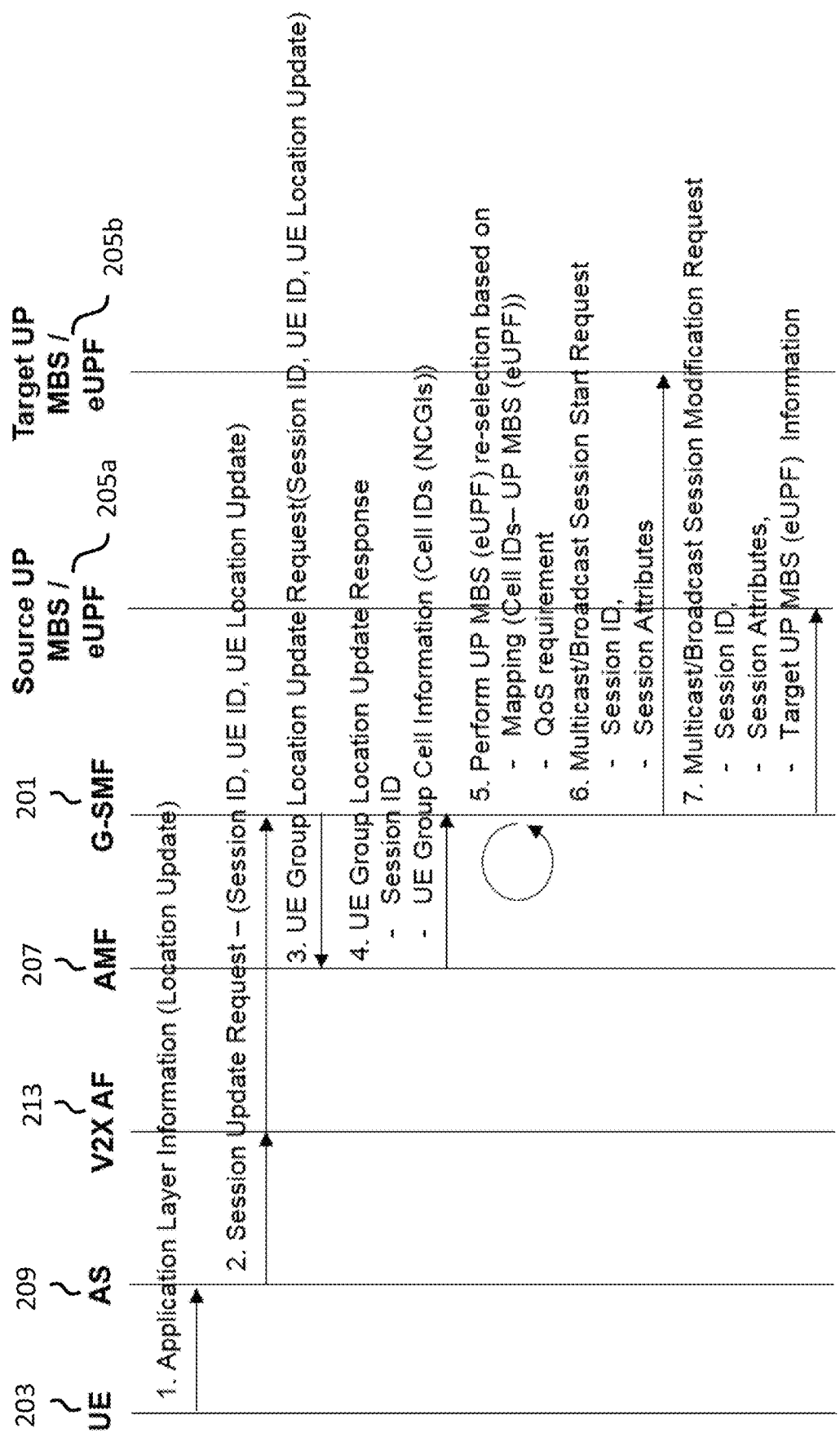
FIG. 9 is a signaling diagram illustrating a re-selection of a user plane function by a network entity according to another embodiment within the exemplary network architecture of FIG. 1.

In the re-selection procedure illustrated in FIG. 9 the network entity 201, in particular G-SMF 201 according to an embodiment is configured to re-select the exemplary target user plane function 205b on the basis of UE IDs and possibly their location information provided in the session update request message (step 2 of FIG. 9). Thus, the main difference between the embodiments shown in FIGS. 7 and 9, is that in step 3 of FIG. 9 the network entity 201, in particular G-SMF 201 sends the UE IDs and possibly their location information to the AMF and not the SAIs, as in step 3 of FIG. 7. As the other steps of FIG. 9 are identical to the corresponding steps of FIG. 7, reference is made to the above detailed description of FIG. 7.

Figure 10:
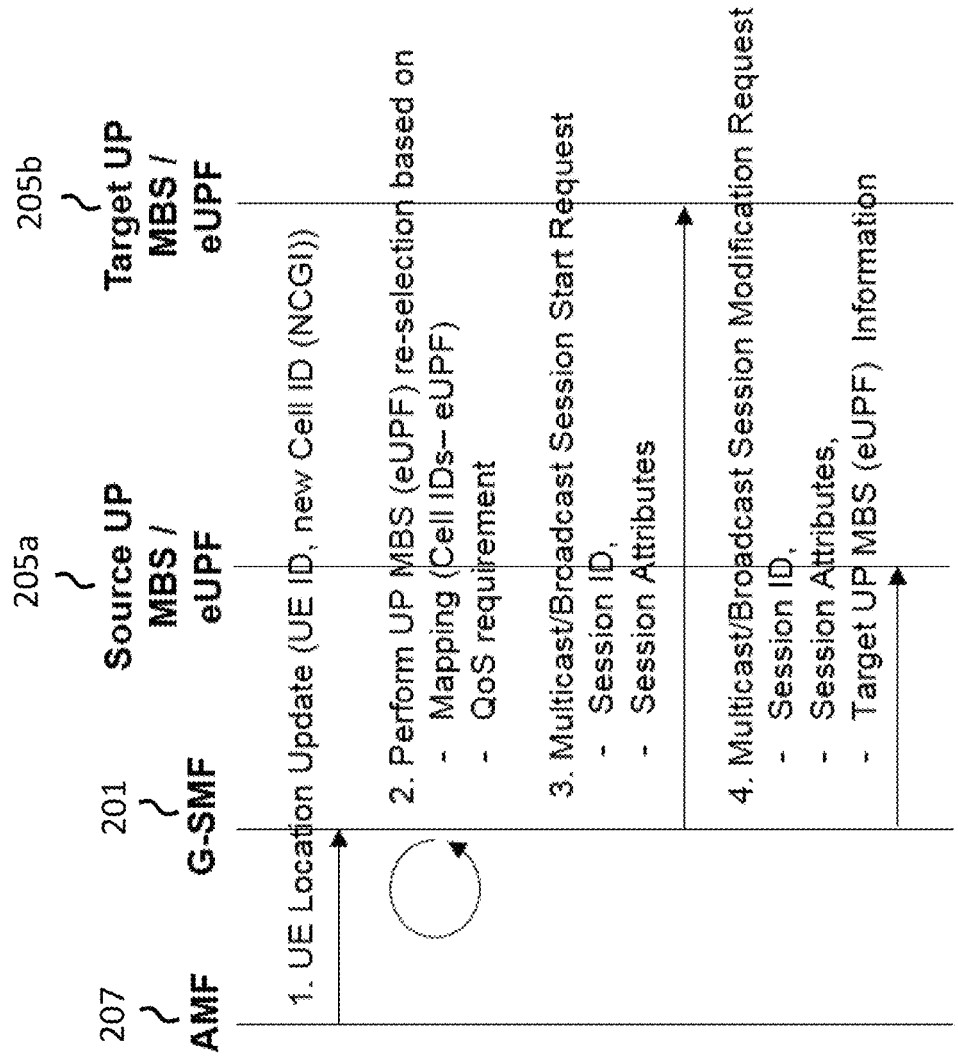
FIG. 10 is a signaling diagram illustrating further aspects of a re-selection of a user plane function by a network entity according to an embodiment within the exemplary network architecture of FIG. 2.

FIG. 10 is a signaling diagram illustrating further aspects of a re-selection of a user plane function by the network entity 201, in particular G-SMF 201 according to an embodiment. As can be taken from FIG. 10, the core network of the communication network 200 may trigger the user plane function re-selection procedure implemented by the network entity 201, in particular G-SMF 201 according to an embodiment. More specifically, when the AMF 207 has an update on the cell information (NCGI) of the UE 203, it provides this information to the network entity 201, in particular G-SMF 201 (step 1 of FIG. 10). Based on the information provided by the AMF 207 the network entity 201, in particular G-SMF 201 performs the re-selection procedure as described above in the context of one of the embodiments of FIGS. 7 to 9.

Figure 11:
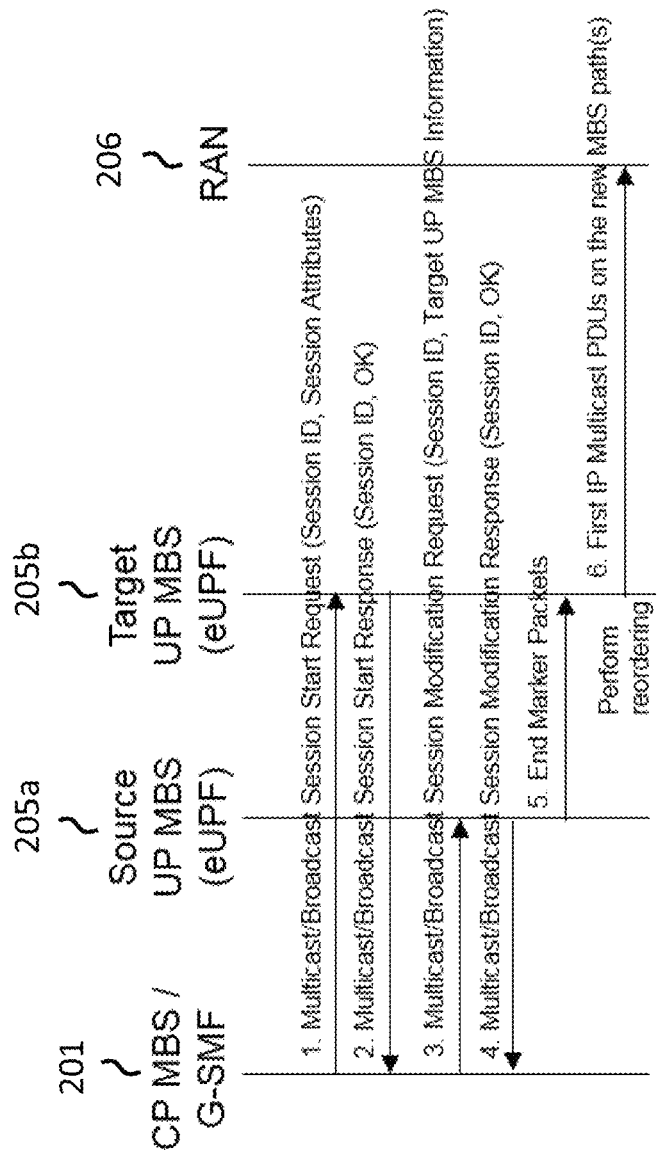
FIG. 11 is a signaling diagram illustrating further aspects of a re-selection of a user plane function by a network entity according to an embodiment within the exemplary network architecture of FIG. 2.

Once the first stage of the re-selection procedure illustrated in FIGS. 7 to 9 is completed, i.e. the target user plane function 205b has been selected by the network entity 201, in particular G-SMF 201, a second stage can follow, which is illustrated in FIG. 11 and comprises the following steps:

1. The network entity 201, in particular G-SMF 201 sends a session start request to the exemplary target user plane function 205b (referred to as Target UP MBS in FIG. 12) including a session ID and session attributes.
2. The exemplary target user plane function 205b acknowledges the request by sending a response message.
3. The network entity 201, in particular G-SMF 201 sends a session modification request message (including Session ID and information about the exemplary target user plane function 205b) to the source user plane function 205a (referred to as Source UP MBS (eUPF) in FIG. 12).
4. The source user plane function 205a acknowledges the request by sending a response message.
5. When the source user plane function 205a receives the modification request message, it may start forwarding received data packets to the target user plane function 205b.
6. The target user plane function 205b may perform a reordering of the data packets received from the source user plane function 205a and/or the application server 209. Once the target user plane function 205b starts receiving data packets either from the source user plane function 205a or the AS 209, it also can start the transmission of these data packets towards the RAN 206.

As illustrated in FIG. 11, in step 5 thereof the source user plane function 205a can optionally send "end marker" data packets to the target user plane function 205b, for instance, in case the multicast/broadcast service may require session continuity and does not tolerate packet losses. The end marker data packets can inform the target user plane function 205b that no further data packets will be received from the source user plane function 205a. The end marker data packets can comprise dummy information, as defined in TS 36.300. Alternatively or additionally, the end marker data packets can comprise user data and an additional identifier or tag for informing the target user plane function 205b that no further data packets will be received from the source user plane function 205a.

Figure 12:
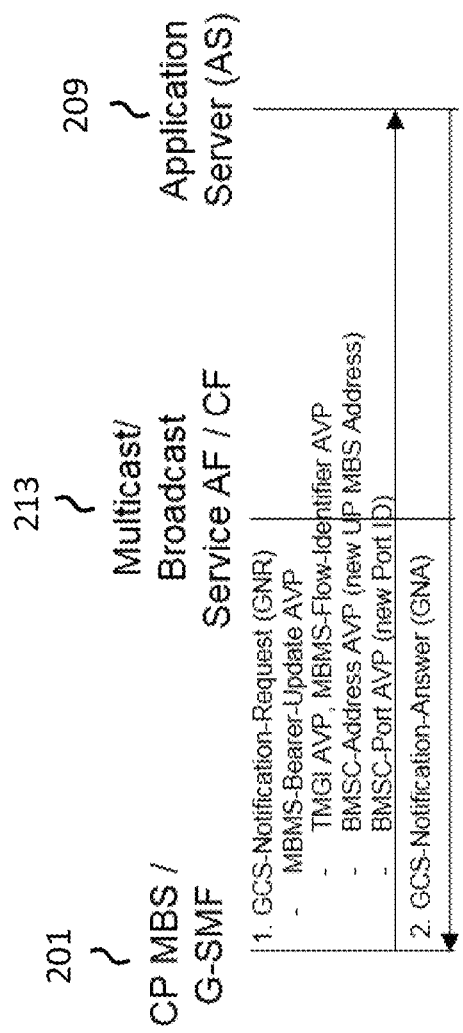
FIG. 12 is a signaling diagram illustrating further aspects of a re-selection of a user plane function by a network entity according to an embodiment within the exemplary network architecture of FIG. 2.

FIG. 12 shows a signaling diagram illustrating a multicast/broadcast bearer update procedure implemented by the network entity 201, in particular G-SMF 201, which includes the target user plane function information, such as the IP address of the target user plane function 205b, so that the application server 209 can forward the related MBS user data to the target user plane function 205b. Furthermore, the application server 209 can also create a new MB2-U secure connection before starting transmission to the target user plane function 205b. Optionally, the AS 209 may forward application packets to both the source user plane function 205a and the target user plane function 205b for a certain duration (i.e., short transition/re-selection time duration which may be specified by the network entity 201, in particular in the notification request message of step 1 of FIG. 12).

Figure 13:
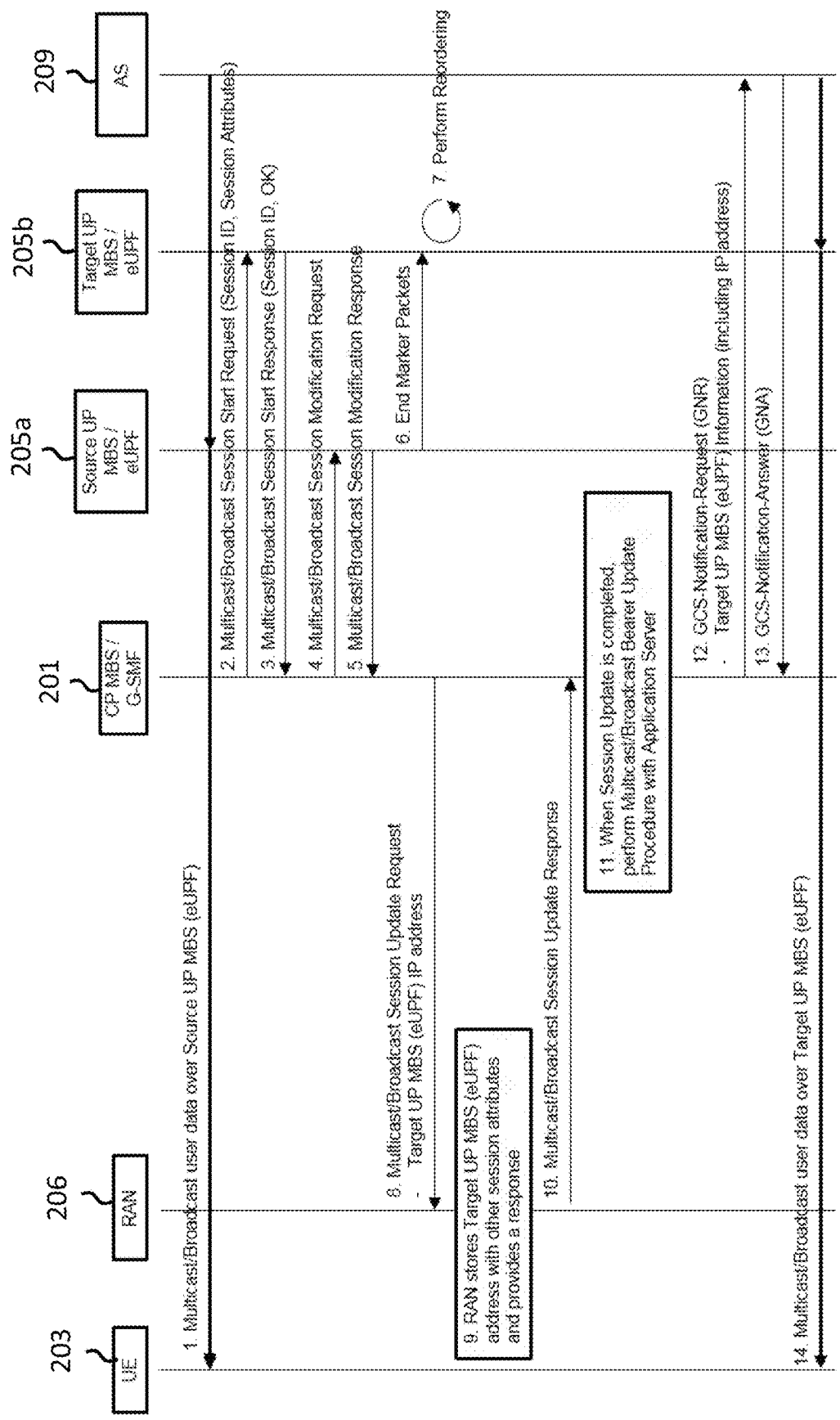
FIG. 13 is a signaling diagram illustrating a re-selection of a user plane function by a network entity according to an embodiment within the exemplary network architecture of FIG. 2.

FIG. 13 provides a summary of the complete user plane function re-selection procedure, i.e. including the first stage and the second stage as already described above. Thus, for more detailed explanations of the steps shown in FIG. 13, reference is made to the corresponding descriptions provided above. As already mentioned in the context of FIG. 11, depending on the service requirements the source user plane function 205a may optionally forward in step 6 of FIG. 13 "end marker" data packets to the target user plane function 205b in order to ensure session continuity. Furthermore, when the RAN 206 receives the "session update request" message from the network entity 201, in particular G-SMF 201 in step 8 of FIG. 14, it may also send an optional join request to target user plane function 205b so that after receiving the join request the target user plane function 205b may start transmitting user data to the RAN 206.

Figure 14:
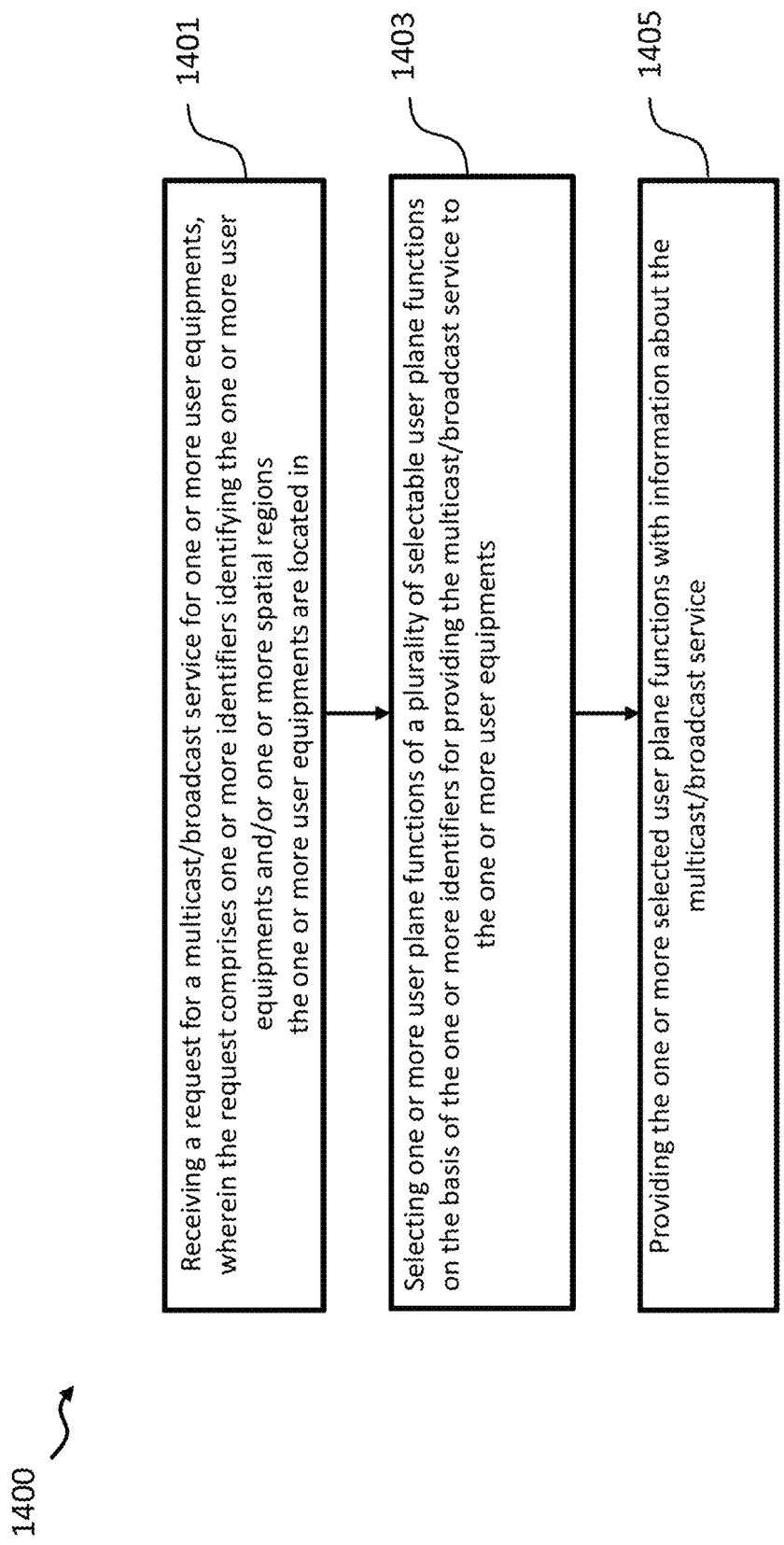
FIG. 14 is a flow diagram showing an example of processing steps of a method for providing a multicast/broadcast according to an embodiment.

FIG. 14 is a flow diagram showing an example of processing steps of a method 1400 for providing a multicast/broadcast according to an embodiment. The method 1400 comprises the steps of: receiving 1401 a request, in particular a session setup request or a session update request, for a multicast/broadcast service for the one or more user equipments 203, wherein the request comprises one or more identifiers identifying the one or more user equipments 203 and/or one or more spatial regions the one or more user equipments 203 are located in; selecting 1403 one or more user plane functions 205a-c of the plurality of selectable user plane functions on the basis of the one or more identifiers for providing the multicast/broadcast service to the one or more user equipments 203; and providing 1405 the one or more selected user plane functions 205a-c with information about the multicast/broadcast service.

Figure 15:
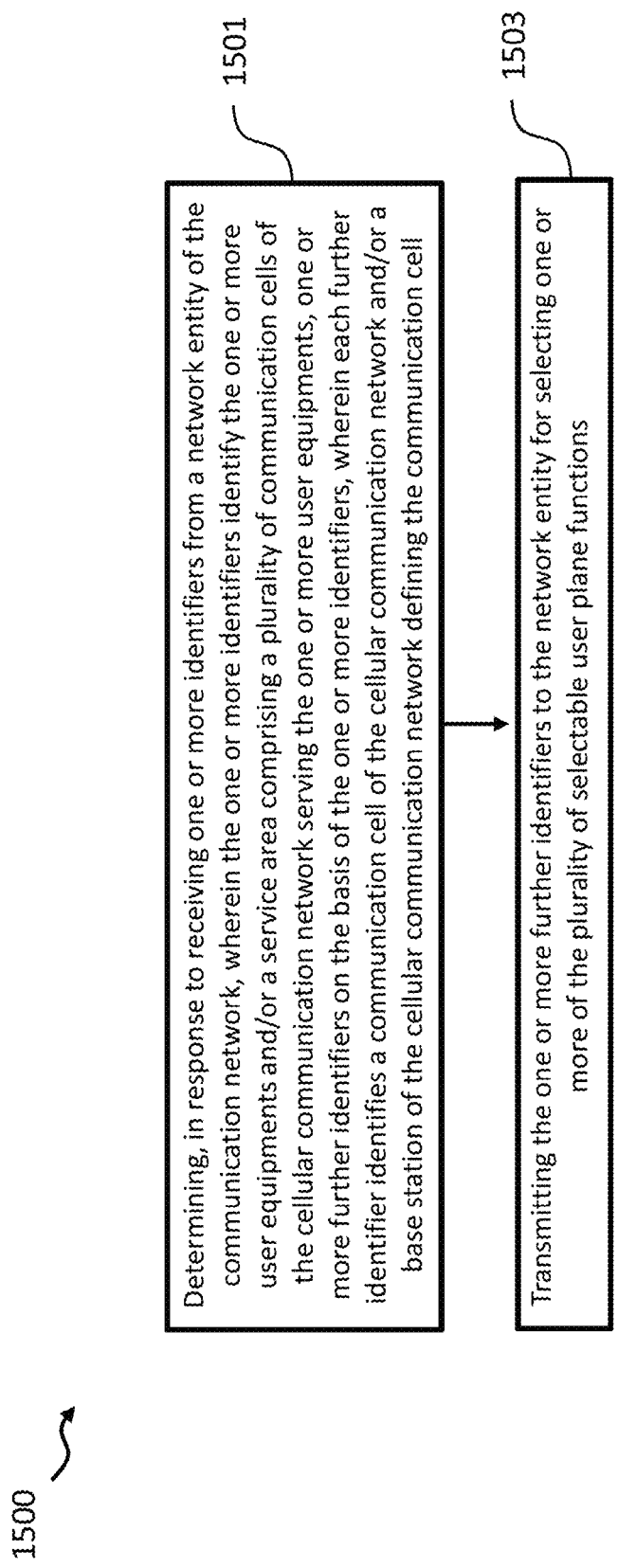
FIG. 15 is a flow diagram showing an example of processing steps of a method of operating an AMF entity according to an embodiment.

FIG. 15 is a flow diagram showing an example of processing steps of a method 1500 of operating the AMF entity 207 according to an embodiment. The method 1500 comprises the steps of: determining 1501, in response to receiving one or more identifiers from the network entity 201 of the communication network 200, wherein the one or more identifiers identify the one or more user equipments 203 and/or a service area comprising a plurality of communication cells of the cellular communication network 200 serving the one or more user equipments 203, one or more further identifiers, in particular one or more cell IDs, on the basis of the one or more identifiers, wherein each further identifier identifies a communication cell of the cellular communication network 200 and/or a base station of the cellular communication network 200 defining the communication cell; and transmitting 1503 the one or more further identifiers to the network entity 201 for selecting one or more of the plurality of selectable user plane functions.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments. In addition, functional units in the embodiments of the present disclosure may be integrated into one processing unit, or each of the units may exist alone physically, or two or more units are integrated into one unit.

Embodiments of the disclosure may further comprise an apparatus comprising processing circuitry configured to perform any of the methods and/or processes described herein.

What is claimed is:

1. A network entity for providing a multicast/broadcast service to one or more user equipments (UEs) in a cellular communication network using one or more user plane functions of a plurality of selectable user plane functions, the network entity comprising:
processing circuitry configured to:
receive a request for a multicast/broadcast service for the one or more UEs, wherein the request comprises one or more identifiers that identify the one or more UEs and a service area comprising a plurality of communication cells of the cellular communication network;
transmit the one or more identifiers to an access and mobility management function (AMF) entity of the cellular communication network;
receive, from the AMF entity in response to transmission of the one or more identifiers thereto, a UE location update message comprising one or more further identifiers identifying one or more communication cells of the cellular communication network in which the one or more UEs are currently located and/or one or more base stations of the cellular communication network defining the one or more communication cells;
select, based on the one or more identifiers and the one or more further identifiers, one or more user plane functions of the plurality of selectable user plane functions for providing the multicast/broadcast service to the one or more UEs; and
provide the one or more selected user plane functions with information about the multicast/broadcast service,
wherein the one or more identifiers are one or more service area identifiers (SAIs) and the one or more further identifiers include one or more cell IDs that correspond to the one or more SAIs.

2. The network entity of claim 1, wherein the processing circuitry is configured to select the one or more user plane functions based additionally on one or more service requirements and/or one or more performance measures of the plurality of selectable user plane functions.

3. The network entity of claim 1, wherein the multicast/broadcast service is initially provided to the one or more UEs using one or more source user plane functions of the plurality of selectable user plane functions, and
wherein the one or more selected user plane functions are one or more target user plane functions for subsequently providing the multicast/broadcast service to the one or more UEs.

4. The network entity of claim 3, wherein the processing circuitry is further configured to inform the one or more source user plane functions of the one or more target user plane functions and to trigger the one or more source user plane functions to forward data packets related to the multicast/broadcast service to the one or more target user plane functions.

5. The network entity of claim 4, wherein the processing circuitry is further configured to trigger the one or more source user plane functions to forward one or more end marker data packets to the one or more target user plane functions,
wherein the one or more end marker data packets inform the one or more target user plane functions that no further data packets will be received from the one or more source user plane functions.

6. The network entity of claim 3, wherein the processing circuitry is further configured to trigger the one or more target user plane functions to reorder data packets received from the one or more source user plane functions and/or from an application server for providing the multicast/broadcast service to the one or more UEs.

7. The network entity of claim 3, wherein the processing circuitry is further configured to inform an application server for providing the multicast/broadcast service to the one or more UEs of the one or more target user plane functions and to trigger the application server to forward data packets related to the multicast/broadcast service to the one or more source user plane functions and/or the one or more target user plane functions for a predefined time duration.

8. The network entity of claim 3, wherein the request is a session update request, and wherein the session update request comprises one or more identifiers identifying the one or more UEs and information about one or more current spatial positions of the one or more UEs.

9. The network entity of claim 1, wherein the network entity is configured to receive the request comprising the one or more identifiers from an application server, an application function and/or a control function of the cellular communication network for providing the multicast/broadcast service to the one or more UEs.

10. The network entity of claim 1, wherein the network entity is a group session management function (G-SMF) or a control plane multicast/broadcast service (CP MBS) entity of the cellular communication network.

11. The network entity of claim 1, wherein the one or more identifiers identify a UE group including the one or more UEs.

12. The network entity of claim 1, wherein the one or more cell IDs that correspond to the one or more SAIs are determined from a mapping of SAIs into cell IDs.

13. The network entity of claim 1, wherein each of the one or more cell IDs is a new radio (NR) cell global identifier (NCGI), a gNB identifier (gNB ID), or a global gNB ID.

14. A method for providing a multicast/broadcast service to one or more user equipments (UEs) in a cellular communication network using one or more user plane functions of a plurality of selectable user plane functions, the method comprising:
receiving a request for a multicast/broadcast service for the one or more UEs, wherein the request comprises one or more identifiers that identify the one or more UEs and a service area comprising a plurality of communication cells of the cellular communication network;
transmitting the one or more identifiers to an access and mobility management function (AMF) entity of the cellular communication network;
receiving, from the AMF entity in response to transmission of the one or more identifiers thereto, a UE location update message comprising one or more further identifiers identifying one or more communication cells of the cellular communication network in which the one or more UEs are currently located and/or one or more base stations of the cellular communication network defining the one or more communication cells;
selecting, based on the one or more identifiers and the one or more further identifiers, one or more user plane functions of the plurality of selectable user plane functions for providing the multicast/broadcast service to the one or more UE; and
providing the one or more selected user plane functions with information about the multicast/broadcast service,
wherein the one or more identifiers are one or more service area identifiers (SAIs) and the one or more further identifiers include one or more cell IDs that correspond to the one or more SAIs.

15. An access and mobility management function (AMF) entity for a cellular communication network comprising a plurality of selectable user plane functions for providing a multicast/broadcast service to one or more user equipments (UEs) of the cellular communication network, the AMF entity comprising:
processing circuitry configured to:
receive, from a network entity of the communication network, one or more identifiers that identify the one or more UEs and a service area comprising a plurality of communication cells of the cellular communication network;
in response to receiving the one or more identifiers from the network entity of the communication network, determine one or more further identifiers identifying one or more communication cells of the cellular communication network in which the one or more UEs are currently located and/or one or more base stations of the cellular communication network defining one or more communication cells, wherein the one or more further identifiers are determined based on the one or more identifiers received from the network entity; and
transmit a UE location update message comprising the one or more further identifiers to the network entity,
wherein the one or more identifiers are included in a request, received by the network entity, for multicast/broadcast service for the one or more UEs,
wherein the one or more identifiers are one or more service area identifiers (SAIs) and the one or more further identifiers include one or more cell IDs that correspond to the one or more SAIs, and wherein the network entity is configured to select, based on the one or more identifiers and the one or more further identifiers, one or more user plane functions of the plurality of selectable user plane functions for providing the multicast/broadcast service to the one or more UEs and to provide the one or more selected user plane functions with information about the multicast/broadcast service.

\* \* \* \* \*

UNITED STATES PATENT AND TRADEMARK OFFICE
CERTIFICATE OF CORRECTION

PATENT NO. : 12,010,591 B2
APPLICATION NO. : 17/176920
DATED : June 11, 2024
INVENTOR(S) : Ayaz et al.

Page 1 of 1

It is certified that error appears in the above-identified patent and that said Letters Patent is hereby corrected as shown below:

In the Claims

Claim 14, Column 16, Line 31: "the one or more UE; and" should read -- the one or more UEs; and --.

Signed and Sealed this
Fifteenth Day of April, 2025

Coke Morgan Stewart
*Acting Director of the United States Patent and Trademark Office*